UNITED STATES PATENT OFFICE.

KARL SCHIRMACHER AND ARNOLD BRUNNER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

BROWN VAT DYE.

No. 888,852.    Specification of Letters Patent.    Patented May 26, 1908.

Application filed December 7, 1907. Serial No. 405,538.

*To all whom it may concern:*

Be it known that we, KARL SCHIRMACHER, Ph. D., and ARNOLD BRUNNER, Ph. D., chemists, being citizens of the Empire of Germany, and residing at Höchst-on-the-Main, Germany, have invented certain Improvements in Brown Vat Dyestuffs, of which the following is a specification.

We have found a vat dyestuff yielding on wool and cotton beautiful and fast brown shades. The composition of the new dyestuff corresponds to the constitution:

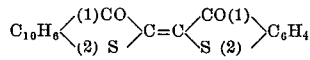

It is a dark brown powder insoluble in water and alkalies, soluble in hot alcohol, glacial acetic acid and anilin with a red-brown color, with cold concentrated sulfuric acid it yields a dull blackish color which on heating turns to a pure blue. When heated with alkaline hydrosulfite, it dissolves with a yellow coloration and with this vat-solution wool and cotton are dyed brown.

The new dyestuff is formed by oxidizing the compound

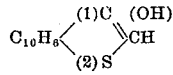

which may be designated as oxythiophenthren. The oxythiophenthren can be obtained, for instance, from naphthalene-2-thioglycollic-1-carboxylic acid $$C_{10}H_6(SCH_2COOH)(COOH)$$

by fusing the latter with caustic alkali and by heating the oxythiophenthrenecarboxylic acid thus obtained in a soda-alkaline solution.

The manufacture of the dyestuff may be carried out, for instance, as follows:—

Example: 23.9 parts by weight of 1-naphthylamin-2-sulfonic acid are diazotized with 30 parts by weight of hydrochloric acid of 20° Bé. and 7 parts by weight of nitrite and the formed diazo introduced into a cuprous cyanid solution, obtained from 25 parts by weight of copper sulfate and 38 parts by weight of potassium cyanid, and gently heated to about 60° C. After some time the mixture is filtered and from the solution, when cold, the 1-cyannaphthalene-2-sulfonic acid is precipitated with common salt as sodium salt. It is readily soluble in water and crystallizes from a dilute solution of common salt in form of small leaflets. 25.5 parts by weight of this dried sodium salt are heated for some time to 100° C. with 22 parts by weight of phosphorus pentachlorid while adding 5 parts by weight of phosphorus oxychlorid until the mass has become liquid. After being cold it is poured, avoiding the rise of temperature, into ice-water and the precipitated 1-cyannaphthyl-2-sulfochlorid is filtered. It crystallizes from a mixture of chloroform and ligroin as long needles melting at 142–143° C. 20 parts by weight of 1-cyannaphthyl-2-sulfochlorid are divided in 240 parts of a cold mixture of 60 parts of sulfuric acid of 60° Bé. and 180 parts of water to which 40 parts of zinc dust are added. The whole is stirred for about 12 hours and finally gently heated. When cold it is filtered and the residue is dissolved in water while heating and adding such proportions of caustic soda-lye until the liquid shows a decided alkaline reaction. It is then filtered and to the filtrate is added a solution of 15 parts of sodium chloroacetate and the whole is heated to 100° C. After a short time a small quantity of dyestuff separates on the surface. It is filtered and to the cooled solution are added hydrochloric acid and common salt; a light yellow product is precipitated consisting of a mixture of naphthalene-2-thioglycolic-1-carboxylic acid and probably 1-cyanaphthyl-2-thioglycolic acid. By repeatedly crystallizing from water the 2-naphthylthioglycolic-o-carboxylic acid is obtained as long needles which, previously sintering, melt at about 98° C.

20 parts by weight of the afore mentioned mixture of dicarboxylic acid and cyancarboxylic acid or 20 parts of naphthalene-2-thioglycolic-acid-1-carboxylic acid are introduced into a mixture of 80 parts by weight of caustic soda and 8 parts by weight of water and the whole is heated to 180–190° C. until the mass, turning soon intensely yellow, becomes solid. It is, when cold, dissolved in water and the greater part of the alkali is neutralized with hydrochloric acid, from the then filtered solution the oxythiophrenthren-carboxylic acid is precipitated by more hydrochloric acid as white flakes which exposed to the air assume a feebly brownish tint. Said acid is readily soluble in a cold soda solution and on heating this solution it is transformed into the oxythiophenthren which crystallizes in form of small brilliant needles altering when exposed to the air and melting at 118–119° C. assuming a dark color. Treated with nitrite and hydrochloric acid an intensely yellow colored nitroso compound is formed both from the oxyghiophenthren and its carboxylic acid.

To obtain the dyestuff the oxythiophenthrencarboxylic acid or the oxythiophenthren is dissolved with caustic soda-lye and potassium ferricyanid added in excess. The dyestuff then precipitates as reddish brown flakes and has the above mentioned properties.

Having now described our invention, what we claim is:

As a new product, the vat-dyestuff being a naphthalene derivative and having the formula:

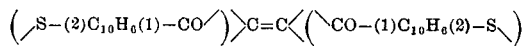

being a brown powder, insoluble in water and alkalies, soluble in hot alcohol, benzene, glacial acetic acid and anilin with a red-brown color, yielding with concentrated sulfuric acid a dull blackish color turning blue when heated, soluble in an alkaline hydrosulfite solution forming a vat with a yellow color from which wool and cotton are dyed brown.

In testimony, that we claim the foregoing as our invention, we have signed our names in presence of two subscribing witnesses.

KARL SCHIRMACHER.
ARNOLD BRUNNER.

Witnesses:
JEAN GRUND,
CARL GRUND.